US006184273B1

(12) United States Patent
December et al.

(10) Patent No.: US 6,184,273 B1
(45) Date of Patent: Feb. 6, 2001

(54) COATING COMPOSITION CONTAINING A COMPOUND WITH LATENT FUNCTIONALITY

(75) Inventors: Timothy S. December, Rochester Hills; Paul J Harris, West Bloomfield, both of MI (US)

(73) Assignee: BASF Corporation, Southfield, MI (US)

( * ) Notice: Under 35 U.S.C. 154(b), the term of this patent shall be extended for 0 days.

(21) Appl. No.: 08/941,131

(22) Filed: Sep. 30, 1997

(51) Int. Cl.[7] .............................. C08K 5/34; C08G 73/00; B32B 27/36
(52) U.S. Cl. ........................... 524/98; 528/367; 528/418; 528/423; 428/412; 428/413; 428/704
(58) Field of Search .............................. 524/98; 528/367, 528/418, 423; 428/412, 413, 704

(56) References Cited

U.S. PATENT DOCUMENTS

| 3,923,842 | 12/1975 | Wu ..................................... 260/340.2 |
| 4,484,994 | 11/1984 | Jacobs, III et al. .................. 204/181 |
| 4,542,173 | 9/1985 | Schupp et al. ............................ 63/2 |
| 4,543,376 | 9/1985 | Schupp et al. ............................ 63/2 |
| 4,720,569 | 1/1988 | Tominaga .............................. 560/26 |
| 4,746,447 | 5/1988 | Wollenburg ......................... 252/51.5 |
| 4,806,611 | 2/1989 | Honel et al. ........................... 528/45 |
| 4,808,658 | 2/1989 | Walz et al. ............................. 528/73 |
| 4,882,391 | 11/1989 | Brindöpke et al. ............... 525/327.2 |
| 4,892,954 | 1/1990 | Brindopke et al. .................. 549/229 |
| 5,001,210 | 3/1991 | Coury et al. ........................... 528/85 |
| 5,075,386 | 12/1991 | Vanderbilt . |
| 5,132,458 | 7/1992 | Hönel et al. . |
| 5,202,383 | 4/1993 | Moriarity et al. .................... 525/124 |

FOREIGN PATENT DOCUMENTS 0 149 156 A2   12/1984   (EP) .............................. C08G/71/00

OTHER PUBLICATIONS

Marcia Agostinho and Vincent Brytus, "A high solids one–component, low temperature bake epoxy coating", vol. 60, No. 764, Sep. 1988, pp. 61–66.
Richard K. Sammel, "One–Component Eposy Provides Low VOC's, High Performance," Oct. 1985, pp. 186–192.
Timothy S. December et al., "Curable Coating Composition Containing A Resin With Latent Amine Functionality", Sep. 30, 1997, pp. 1–33, U.S. Ser. No. 08/941,562.
Timothy S. December et al., "Cathodic Electrocoat Composition Having Latent Functionality", Sep. 30, 1997, pp. 1–37, U.S. Ser. No. 08/941,561.

Primary Examiner—Kriellion Sanders
(74) Attorney, Agent, or Firm—Mary E. Golota

(57) ABSTRACT

A composition comprising a compound having latent primary amine functionality is described. The compound having latent amine functionality is obtained by reacting a cyclic anhydride with an amine compound having two primary amine groups and one secondary amine group. The latent amine compound is combined with a compound having a plurality of cyclic carbonate groups in a crosslinkable coating composition.

36 Claims, No Drawings

COATING COMPOSITION CONTAINING A COMPOUND WITH LATENT FUNCTIONALITY

FIELD OF THE INVENTION

The present invention relates to coating compositions having latent amine functional compounds, and particularly to such compositions having cyclic carbonate compounds.

BACKGROUND OF THE INVENTION

Thermosetting, or curable, coating compositions are widely used in coatings operations. In automotive coatings, in particular, thermoset coatings provide durable finishes. Automotive coatings include primers and topcoats, which may be single layer enamels or two layer basecoat/clearcoat systems. The primer may be applied either as a first coating layer or over another layer, for example over an electrocoat primer layer. The topcoat is then usually applied directly over the primer layer.

While thermosetting compositions provide desirable coating properties, there are a number of concerns that arise with thermosetting coating compositions. One consideration is the curing conditions needed to achieve sufficient crosslinking of the film. In general, higher temperatures and longer times at the curing temperature increase the manufacturing costs of the coated article. Another concern in some cases is that undesirable by-products of the curing reaction are generated. For example, blocked curing agents release the blocking agents as volatile organic compounds that constitute emissions regulated by various government rules. It is also important that the crosslinks that are formed are suitable for providing long life to the coating under the particular conditions to which the coated article will be exposed.

Different crosslinking mechanisms may be employed in thermosetting coatings. One curing mechanism utilizes a melamine formaldehyde resin curing agent in the coating composition to react with hydroxyl groups on the resin. This curing method provides good cure at relatively low temperatures (e.g., 250° F. with a blocked acid catalyst, or even lower with an unblocked acid catalyst), but the crosslink bonds contain undesirable ether linkages and the resulting coatings may provide poor overall durability under certain service conditions. In an alternative curing method, polyisocyanate curing agents may be reacted with amine or hydroxyl groups on the resin. This curing method provides desirable urea or urethane crosslink bonds, but it also has several disadvantages. In order to prevent premature gelation of the coating composition, the polyisocyanate must either be kept separate from the resin in what is known in the art as a two-package or two-pack coating system or else the highly reactive isocyanate groups on the curing agent must be blocked (e.g., with an oxime or alcohol). Blocked polyisocyanates, however, require high temperatures (e.g., 150° C. or more) to unblock and begin the curing reaction. The volatile blocking agents released during cure can adversely affect coating properties, as well as increasing the volatile organic content for the composition.

There is thus a need in the art for coating compositions that could provide desirable urethane crosslink linkages, but avoid the problems that accompany the use of polyisocyanate curing agents.

Coating compositions comprising carbonate curing agents and primary amine-functional crosslinkable resins have been proposed for electrocoat primers in December et al., U.S. Pat. No. 5,431,791. In the electrocoat bath, the primary amine groups are salted and rendered unreactive with the carbonate groups of the carbonate compound. When the coating is deposited onto the conductive substrate, the primary amine groups are regenerated from the salt and are once more reactive toward the carbonate curing agent. This method of achieving package stability, however, is unsuitable for solventborne and non-cathodic waterborne compositions.

SUMMARY OF THE INVENTION

We have now invented a coating composition capable of forming durable urethane linkages upon curing of the coating without the attendant problems of polyisocyanate curing agents. The compositions of the present invention comprise a compound having a plurality of latent primary amine groups and a compound having a plurality of cyclic carbonate groups. The present invention further provides a method of coating a substrate by applying a coating composition comprising a resin having latent primary amine functionality and a carbonate compound having a plurality of cyclic carbonate groups and then curing the applied composition. The present invention also provides a substrate having thereon a coating derived from a composition containing a compound having latent primary amine functionality and a carbonate compound having a plurality of cyclic carbonate groups.

DETAILED DESCRIPTION

The compositions of the invention include a compound having latent primary amine functionality and a compound with a plurality of cyclic carbonate groups. The compound having latent amine functionality may be formed by reacting two moles of a cyclic anhydride of a polycarboxylic acid with two moles of a compound having at least two primary amine groups. The compound having a plurality of cyclic carbonate groups has at least two carbonate groups, and preferably has more than two carbonate groups on average per molecule.

In the synthesis of the compound with latent primary amine functionality, an amine compound with preferably two primary amine groups is employed. The amine compound may optionally have additional functional groups that are not primary amine groups, so long as such groups do not interfere with the reaction between the primary amine groups of the amine compound and the cyclic anhydride. Suitable examples of the primary amine compounds include, without limitation, α,ω-alkylenediamines and polyalkylene polyamines. Examples of suitable polyalkylene polyamines include, without limitation, ethylenediamine, diethylenetriamine, triethylenetetramine, tetraethylenepentamine, dipropylenetriamine, 1,6-diaminohexane, 1,3-diaminopropane, methyl imino-bis(propylamine), 1,4-diaminobutane, and mixtures of these. Particularly preferred among these are ethylenediamine, diethylenetriamine, dipropylenetriamine, and mixtures of these compounds. Preferred polyamines have molecular weights in the range of about 60 to about 400, more preferably from about 60 to about 250, and still more preferably from about 60 to about 160.

Suitable examples of cyclic anhydrides of polycarboxylic acids that may be used in the reaction with the primary amine compound include, without limitation, phthalic anhydride and substituted derivatives of phthalic anhydride such as 4-sulfophthalic anhydride, 4-methylphthalic anhydride, 3-hydroxyphthalic anhydride, nitrophthalic anhydride, and 4,4'-carbonyldiphthalic anhydride; hydrogenated derivatives of phthalic acid such as hexahydrophthalic anhydride, 1,2, 3,6-tetrahydrophthalic anhydride, 3,4,5,6-tetrahydrophthalic anhydride, hexahydro-4-methylphthalic anhydride, and methyltetrahydrophthalic anhydride; maleic anhydride and its derivatives, such as 2,3-dimethylmaleic anhydride, 2,3-diphenylmaleic anhydride, bromomaleic anhydride, and dichloromaleic anhydride; pyromellitic dianhydride; succinic anhydride and its derivatives, such as dodecenylsuccinic anhydride, and methylsuccinic anhydride; 1,2-cyclohexane dicarboxylic acid, nadic methyl anhydride (methyl-5-norborene-2,3-dicarboxylic anhydride), cis-5-norborene-endo-2,3-dicarboxylic anhydride, itaconic anhydride, 2,3-pyridinedicarboxylic anhydride, pyromellitic dianhydride, endo-bicyclo[2.2.2]oct-5-ene-2,3-dicarboxylic anhydride, 1,2,3,4,-cyclobutanetetracarboxylic dianhydride, and 1-cyclopentene-1,2-dicarboxylic anhydride. Preferred among these are phthalic anhydride and substituted derivatives of phthalic anhydride and hydrogenated derivatives of phthalic acid.

The reaction between the cyclic anhydride and the amine compound is may be carried out with about a stoichiometric ratio of the reactants, but preferably is carried out using an excess of the amine compound. It is preferred to employ a ratio of at least about two moles, and preferably at least about three moles, of the primary amine compound per mole of the anhydride. In a particularly preferred embodiment, a ratio of about four moles of the primary amine compound is used per mole of the anhydride. For example, it is preferred to use a ratio of about four moles of diethylenetriamine to about one mole of phthalic anhydride. The excess amine compound is removed, for example by vacuum distillation, following completion of the reaction. For reasons that the person of skill in the art will appreciate, the ratio of moles of primary amine compound to anhydride should not be too high, and it is preferred that the ratio not exceed about eight moles, and preferably about six moles, of primary amine compound per mole of the anhydride. The product of the excess amine compound procedure is found to have a low concentration of, or to be free of, residual carboxylic acid groups. This is thought to indicate that the cyclic tetramide is preferentially formed over a linear product.

The reaction product of the amine compound and the cyclic anhydride may have a polydispersity of about 20, but lower polydispersities are preferred. The polydispersity is preferably less than about 5, and even more preferably less than about 3. The reaction product of the amine compound and the cyclic anhydride more preferably has a polydispersity of about 2 or less, and even more preferably about 1.1 or less. Reaction products that have a polydispersity of about 1.05 or less are particularly preferred. The reaction product has at least two latent primary amine per molecule on average.

The crosslinkable resin of the invention has latent amine functionality that may be represented by the structure (I):

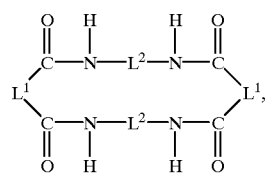

(I)

in which $L^1$ is a bivalent linking group in which the bonding valences, connecting to the carbon of the amide carbonyl, are on two adjacent carbon atoms and in which $L^2$ is a linking group with terminal carbon atoms. The adjacent, bonding carbon atoms of $L^1$ may be bonded to one another with a single bond (as for the product prepared using hexahydrophthalic anhydride), a double bond (as for the product prepared using maleic anhydride), or an aromatic bond (as for the product prepared using phthalic anhydride). Either or both of the adjacent bonding carbon atoms may carry a substituent or the adjacent bonding carbon atoms may be members of an aliphatic or aromatic ring, wherein the ring may itself be substituted at any available carbon atom. Thus, $L^1$ may have the various structures

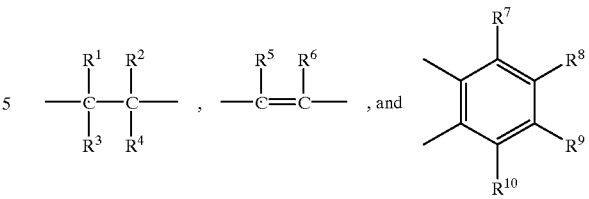

wherein $R^1$ through $R^{10}$ may independently be selected from hydrogen; halides; alkyl, cycloalkyl, or aryl groups, including derivatives of these such as halogenated and sulfonated derivatives; or two R groups may together form a cyclic structure. $L^2$ is preferably an arylene, alkylene, or N,N'-dialkyleneamine group, with the alkylene groups having preferably about eight or fewer carbon atoms.

The compositions of the invention further include at least one compound having a plurality of carbonate groups. The carbonate compound may comprise cyclic carbonate groups having various ring sizes as are known in the art, such as five-member cyclic carbonate rings, six-member cyclic carbonate rings, seven-member cyclic carbonate rings, or fused ring systems containing the characteristic —O—CO—O— carbonate moiety.

Cyclic carbonate compounds may be synthesized by any of several different approaches. One approach involves reacting an epoxy group-containing compound with $CO_2$, preferably under pressure with a catalyst. Useful catalysts include any that activate an oxirane ring, such as tertiary amine quaternary salts (e.g., tetramethyl ammonium bromide), tin and/or phosphorous complex salts (e.g., $(CH_3)_3SnI$, $(CH_3)_4PI$). Epoxides can also be reacted with β-butyrolactone in the presence of such catalysts. In another approach, a glycol, such as glycerin, may be reacted at temperatures of at least about 80° C. (usually under reflux) with diethyl carbonate in the presence of a catalyst (e.g., potassium carbonate) to form a cyclic carbonate. Alternatively, a functional compound containing a ketal of a 1,2-diol having the structure:

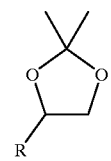

can be ring-opened with water at temperatures of at least 60° C., preferably with a trace amount of acid, to form a 1,2-glycol. As an alternative to reaction with diethyl carbonate, glycols can be reacted with phosgene in the presence of sodium hydroxide to form a cyclic carbonate. Five-member cyclic carbonate rings can be formed from 1,2-glycols. Six-member cyclic carbonate rings can be formed from 1,3-glycols. Fused rings may be formed, for example, by the reaction of phenol with phosgene to form phenylene carbonate. Cyclic carbonates typically have 5-6-member rings. Five-member rings are preferred, due to their ease of synthesis and to a greater degree of commercial availability.

In a preferred embodiment, compounds useful as the carbonate compound are prepared by reaction of a polyepoxide with carbon dioxide to convert the epoxy groups to cyclic carbonate groups. Polyepoxides useful for preparing the carbonate compounds include monomeric, oligomeric, and polymeric polyepoxide materials. Among preferred compounds for synthesis of the carbonate compounds of the invention are glycidyl ethers of polyols and glycidyl esters of polyacids. The polyepoxides can be reacted with carbon dioxide, as described above, to form the cyclic carbonate compound.

The polyepoxide compound may be any aliphatic or aromatic compound having at least two epoxide groups per molecule on average, and it is preferred to employ compounds that have from about 2 to about 4 epoxide groups per molecule on average. Examples of useful polyepoxide compounds include, without limitation, polyglycidyl ethers and esters, epoxy novolac resins, and epoxide-functional acrylics. In particular, the polyepoxide compound may be the polyglycidyl ether of aliphatic or aromatic polyols such as 1,4-butanediol, neopentyl glycol, cyclohexane dimethanol, diethylene glycol, polyethylene glycol, dipropylene glycol, polypropylene glycol, 2,2,4-trimethyl-1,3-pentanediol, 1,6-hexanediol, trimethylolpropane, trimethylolethane, glycerol, bisphenol A (4,4'-isopropylidenediphenol), hydroquinone, 4,4'-biphenol, 2,2'-biphenol, 4,4'-dihydroxybenzophenone, 1,5-dihydroxynaphthylene, novolac polyphenols, resorcinol, and similar compounds. In principle, the glycidyl ether of any polyol can be used. The polyepoxide compound is preferably a polyglycidyl ether of a polyphenol, and particularly preferably, it is the diglycidyl ether of bisphenol A. The polyepoxide compound could also be extended, for example by reaction of the diglycidyl ether of bisphenol A with a polyphenol such as bisphenol or with a polyamine such as those sold by BASF AG of Germany under the tradename POLYAMIN and under the tradename Jeffamine® by Huntsman Co. of Houston, Tex.

The novolac epoxy resin may be epoxy phenol novolac resins or epoxy cresol novolac resins having the formula I:

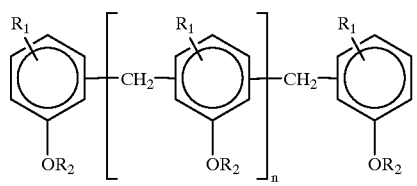

(I)

in which $R_1$ is H or methyl, $R_2$ may be H or a glycidyl group, with the proviso that on average at least two $R_2$ groups per molecule are glycidyl groups and preferably from two to four $R_2$ groups per molecule are glycidyl groups, and n is from 0 to 12, preferably from 1 to 6, and more preferably from 1 to 2. The novolac resin may also be an aromatic novolac bisphenol A resin, having either the formula II

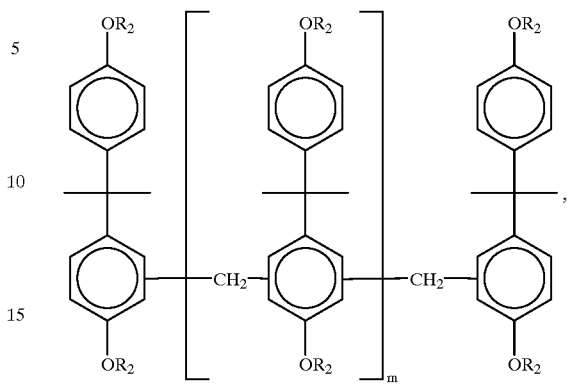

(II)

or the formula III

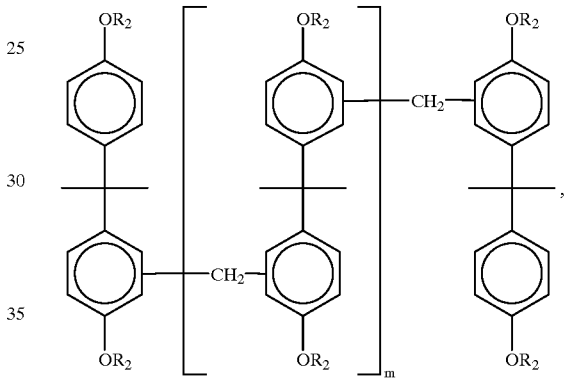

(III)

wherein, for each formula, $R_2$ may be H or a glycidyl group, with the proviso that on average at least two $R_2$ groups per molecule are glycidyl groups, and m is from 0 to 4, preferably from 0 to 2. Although not all of the oxirane groups of the novolac resin must be converted to carbonate groups, it is preferred that all of the oxirane groups are converted to carbonate groups.

Polyglycidyl esters of polyacids are also useful in the present invention. Preferably, the polyglycidyl ester is the ester of a compound having two to about four carboxylic acid groups. Such esters include, without limitation, the diglycidyl esters of terephthalic acid, succinic acid, glutaric acid, 2,6-naphthylene dicarboxylic acid, and oxalic acid.

The range of useful epoxide equivalent weights for the polyepoxide compounds is broad, but in general it is preferred that the epoxide equivalent weight should be chosen to yield a sufficient crosslink density on curing to make a film that is strong and durable. In one preferred embodiment, the epoxide equivalent weight is from about 50 to about 500.

Other compounds having higher carbonate functionality may be obtained, for example, by reacting one mole of a diisocyanate such as isophorone diisocyanate with two moles of a polyol such as trimethylol propane to produce a tetrafunctional alcohol, which can be epoxidized with an epihalohydrin to produce a tetrafunctional polyepoxide. The tetrafunctional polyepoxide can in turn be reacted with carbon dioxide to form a tetrafunctional cyclic carbonate. Other higher-functionality polyepoxides, e.g., tetrakis(4-glycidyloxy-phenyl)ethane or the epoxide-functional novolac epoxies, may also be reacted with $CO_2$ to form poly-cyclic carbonates. Even substantially higher functionalities can be used, such as polymeric polyepoxides (e.g., epoxide-functional acrylic resins) converted to polymeric cyclic carbonate compounds, for which the functionality will be a function of the equivalent weight of the polymer.

One preferred class of cyclic carbonate compounds useful as the carbonate compound of the invention are compounds having an average of at least about four cyclic carbonate groups. In another preferred embodiment, each cyclic carbonate group is appended to an ether segment, for example a segment having at least one unit of propylene oxide. Such cyclic carbonate compounds may be prepared by reacting a polyether polyol with an epihalohydrin to convert the hydroxyl groups to epoxy groups. The polyether polyols may be based upon simple polyols having three or four hydroxyl groups, or mixtures of such compounds. Illustrative examples include, without limitation, trimethylolpropane, pentaerythritol, 1,2,6-trihydroxyhexane, xylose, adonitol, and so on. The epoxy groups may then be converted to cyclic carbonate groups by reaction with $CO_2$. Examples of useful polyether polyols include polypropylene glycols based on pentaerythritol and having up to 7 total polyether units.

One route for the preparation of cyclic ring carbonates can be represented by the formula:

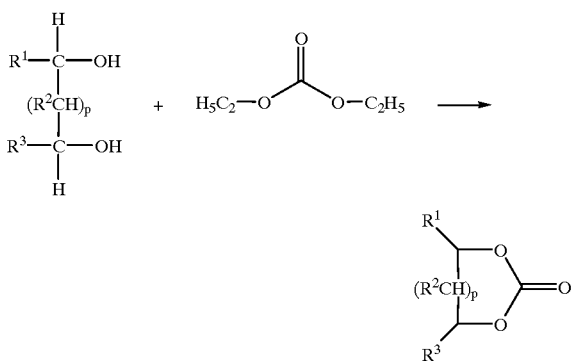

where p is 0 or a positive integer (preferably 0, 1, or 2) and $R^1$, $R^2$, and $R^3$ are each independently H or an organic radical with the proviso that at least one of $R^1$, $R^2$, and $R^3$ is an organic radical to which other cyclic carbonate groups can be attached or a group capable of bonding to an organic radical to which other cyclic carbonate groups can be attached.

In one preferred embodiment of the invention, the carbonate compounds are represented by the formula:

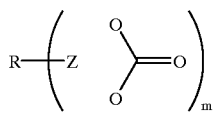

where R represents a polyvalent organic radical, and preferably a trivalent or tetravalent organic radical; Z represents the carbon atoms necessary to complete a substituted or unsubstituted five-, six-, or seven-member cyclic carbonate ring; and m represents an integer of at least 2.

In another preferred embodiment of the invention, the carbonate compounds are represented by the formula:

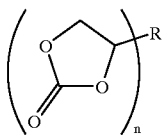

where R represents a polyvalent organic radical, and preferably a trivalent or tetravalent organic radical; and n is at least about two, more preferably at least about 3, and n is preferably up to about eight, more preferably up to about 6, and even more preferably up to about 4.

The coating compositions used in the practice of the present invention are preferably powder coating compositions or solventborne coating compositions. The above components are uniformly mixed, optionally along with other ingredients to form a coating composition. Suitable other ingredients include organic solvents, antioxidants, UV absorbers, light stabilizers, pigments, fillers, catalysts, rheology control agents, adhesion promoters, and so forth. In general, a solvent may be used to prepare a composition that is in a substantially liquid state. Depending upon the solubility characteristics of the various coating components, a solvent may be selected from ketones, esters, glycol ethers and esters of glycol ethers, aprotic amides, aromatic solvents, and other solvents that are commonly utilized for coating compositions.

The coating composition of the invention may further contain one or more pigments. The pigments may be inorganic pigments, including metal oxides, chromates, molybdates, phosphates, and silicates. examples of inorganic pigments that could be employed include without limitation, titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, talc, barytes, ferric ferrocyanide (Prussian blue), ultramarine, lead chromate, lead molybdate, and lead silicate. Organic pigments may also be used. examples of useful organic pigments include, without limitation, metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and the like. Flake pigments such as metallic flake pigments and mica pigments are included when a metallic or pearlescent effect is desired. The preferred pigments depend upon the desired color of the coating. When the coating applied is a primer, extenders such as clay and anti-corrosion pigments are commonly included. The pigments may be dispersed using a grind resin or, preferably, a pigment dispersant, using methods well-known in the art.

The coating compositions of the invention may be thermally cured at a temperature sufficiently high to generate primary amine groups from the latent primary amine groups. Usually, the coating will be cured at a temperature of at least about 80° C., preferably at least about 100° C., and particularly preferably at least about 120° C. The curing time will vary depending on the particular components used, and physical parameters such as the thickness of the layers, however, typical curing times range from 15 to 60 minutes. Unlike curing of systems with blocked isocyanate carbonate compounds or with alkylated melamine resins, the curing chemistry of the present invention does not involve release of a volatile organic by-product. Thus, the inventive compositions offer the significant advantages of producing lower emissions and of providing a higher conversion of paint solids into cured coating.

The coating preparations according to the invention may be used to coat various kinds of substrates using any of a number of processes known to those skilled in the art, such as spraying, roll coating, and coil coating methods and so on. Preferably, the substrate is a plastic or metallic substrate. In a preferred embodiment, the substrate is an automotive component such as a body panel. The compositions of the invention are preferably employed as exterior automotive coatings. The substrate may have one or more layers of coating before the present compositions are applied, particularly when the composition according to the present invention is applied as a topcoat.

When the coating compositions of the invention are applied as a primer layer to a substrate, a pigmented resin coating and optionally a clearcoat layer may be applied over the primer layer. In automotive applications, the pigmented resin layer is often called a basecoat or color coat when a clearcoat layer is to be applied on top of it, or a topcoat when the pigmented resin coating is to be the outer layer. The resin in the pigmented resin layer can be of a number of resins known in the art. For example, the resin can be an acrylic, a polyurethane, or a polyester. Typical pigmented resin coating formulations are described in U.S. Pat. Nos. 4,791, 168, 4,414,357, and 4,546,046, the disclosures of which are incorporated herein by reference. In one preferred embodiment, the resin is an ε-caprolactone-modified acrylic resin, as described in U.S. Pat. No. 4,720,528, the disclosure of which is incorporated herein by reference. The pigmented resin can be cured by any of the known mechanisms and carbonate compounds, such as a melamine polyol reaction (e.g., melamine cure of a hydroxy-functional acrylic resin).

Other pigmented basecoat compositions for such composite coatings are well-known in the art, and do not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. Basecoat polymers are preferably crosslinkable, and thus comprise one or more type of crosslinkable functional groups. Such groups include, for example, hydroxy, isocyanate, amine, epoxy, acid, anhydride, acrylate, vinyl, silane, and acetoacetate groups. These groups may be masked or blocked in such a way so that they are unblocked and available for the cross-linking reaction under the desired curing conditions, generally elevated temperatures. Preferred crosslinkable functional groups include hydroxy functional groups and amino functional groups.

Basecoat polymers may be self-crosslinkable, or may require a separate carbonate compound that is reactive with the functional groups of the polymer. When the polymer comprises hydroxy functional groups, for example, the carbonate compound may be selected from aminoplast resins, isocyanates and blocked isocyanates (including isocyanurates), and acid or anhydride functional crosslinking agents. Preferably, a clearcoat containing a vehicle having carbamate functionality, as for example a clearcoat according to U.S. Pat. No. 5,474,811, is applied wet-on-wet over a layer of a basecoat composition. The coatings applied over the electrocoat coating layer of the invention are applied and, preferably, crosslinked according to methods well-known in the art.

The invention is further described in the following example. The example is merely illustrative and does not in any way limit the scope of the invention as described and claimed. All parts are parts by weight unless otherwise noted.

Synthesis 1: Preparation of Latent Amine Compound

A latent amine compound was prepared according to Example 2 of Moran, Jr., et al., U.S. Pat. No. 3,639,657. The product had a number average molecular weight of 326 and a weight average molecular weight of 4973, as measured by GPC against a polystyrene, thus having a polydispersity of about 15.2. The amine equivalent weight was determined by titration with 0.1N HCl to be 7.5 meq. base per gram of resin solids.

Synthesis 2: Preparation of Latent Amine Compound

A 1-liter glass flask was charged with 340 grams of fresh diethylenetriamine. The diethylenetriamine was heated to about 90° C. under a nitrogen blanket. A total of 122.3 grams of phthalic anhydride (ACS grade, >99.5%) was added over a period of about 20 minutes. The reaction mixture was held at 100° C. for two hours. The reaction mixture was then vacuum stripped. The residue (165.5 grams) was ground, washed with three 350-ml portions of THF, then dried in the oven. The product (about 150 grams) had a number average molecular weight of 143 and a weigh average molecular weight of 154, as measured by GPC. The amine equivalent weight was determined by titration to be 164 eq./gram.

Synthesis 3: Preparation of Carbonate Compound

A stainless steel pressure reactor was charged with 270.0 grams of a tetraglycidyl ether (reaction product of pentaerythritol, propylene oxide, and epichlorohydrin having a weight per epoxide of 169.5) and 5.0 grams of tetrabutylammonium bromide. The contents of the reactor were heated to 105° C. under a steady stream of carbon dioxide gas. The system was then pressurized with carbon dioxide to a pressure of 120 psi and this pressure was maintained by addition of $CO_2$ as needed through the remained of the reaction. The reaction mixture was held under these conditions for 7 hours, at which time the heat was turned off and the reaction mixture was left to cool for 14 hours. Analysis by titration of epoxide groups indicated that the reaction was complete.

Synthesis 4: Preparation of Coating Composition

The latent amine compound of Synthesis 2 was reduced to 50% solids in methanol. A 7.2-gram portion of the reduced latent amine compound was blended with 5.0 grams of the carbonate crosslinker of Synthesis 2 (equivalent ratio of 1:1). The mixture was drawn down on a glass plate at a wet film thickness of 4 mils. The methanol was allowed to evaporate for 5 minutes at room temperature, and then the drawdown was baked for 30 minutes at 330° F. The cured film was a clear yellow and had an MEK solvent resistance of 50 rubs.

The invention has been described in detail with reference to preferred embodiments thereof. It should be understood, however, that variations and modifications can be made within the spirit and scope of the invention and of the following claims.

What is claimed is:

1. A coating composition comprising:
   (a) a compound with latent primary amine functionality comprising the reaction product of:
      (i) a cyclic anhydride and
      (ii) an amine compound comprising two primary amine groups; and
   (b) a compound comprising a plurality of cyclic carbonate groups.

2. A coating composition according to claim 1, wherein the compound (b) is a carbonated polyepoxide resin.

3. A coating composition according to claim 2, wherein the polyepoxide resin is selected from the group consisting of epoxy resins, epoxide-functional acrylic resins, and mixtures thereof.

4. A coating composition according to claim 3, wherein the polyepoxide resin is based on a novolac epoxy.

5. A coating composition according to claim 3, wherein the polyepoxide resin is a bisphenol A-based epoxy resin.

6. A coating composition according to claim 2, wherein the polyepoxide resin is the polyglycidyl ether reaction product of a polyol, an alkylene oxide, and epichlorohydrin.

7. A coating composition according to claim 1, wherein the compound (a) has a polydispersity of about 3 or less.

8. A coating composition according to claim 1, wherein the compound (a) has a polydispersity of about 1.1 or less.

9. A coating composition according to claim 1, wherein the compound (a) has a polydispersity of about 1.05 or less.

10. A coating composition according to claim 1, wherein the compound (a) is formed by reacting a molar excess of the amine compound (ii) with the cyclic anhydride.

11. A coating composition according to claim 10, wherein there is a ratio of at least about four moles of amine compound (ii) for each mole of cyclic anhydride.

12. A coating composition according to claim 1, wherein the cyclic anhydride is selected from the group consisting of phthalic anhydride compounds, hydrogenated phthalic anhydride compounds, succinic anhydride compounds, and maleic anhydride compounds.

13. A coating composition according to claim 1, wherein the amine compound (ii) is a polyalkylene polyamine.

14. A coating composition according to claim 1, wherein the amine compound (ii) is an α,ω-alkylenediamine.

15. A coating composition according to claim 1, wherein the compound (a) is the reaction product of a ratio of at least about four moles of diethylenetriamine for one mole of phthalic anhydride.

16. A coating composition according to claim 1, wherein the compound (b) has at least about three cyclic carbonate groups per molecule, on average.

17. A coating composition comprising
(a) a compound having a structure

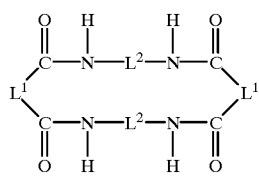

wherein $L^1$ is a bivalent linking group in which the bonding valences are on two adjacent carbon atoms, and further wherein $L^2$ is selected from the group consisting of arylene, alkylene, and N,N'-dialkyleneamine groups; and (b) a compound comprising a plurality of cyclic carbonate groups.

18. A substrate having thereon a coating derived from a composition according to claim 1.

19. A substrate having thereon a coating derived from a composition according to claim 17.

20. A process for preparing a coating composition, comprising the steps of:
(a) reacting a cyclic anhydride and an amine compound comprising two primary amine groups to form a latent amine compound; and (b) combining the latent amine compound with a compound comprising a plurality of cyclic carbonate groups.

21. The coating composition of claim 1 wherein the amine compound (ii) comprising two primary amine groups further comprises a secondary amine group.

22. The process of claim 20 wherein the amine compound comprising two primary amine groups further comprises one secondary amine group.

23. A coating composition comprising:
(a) a compound with latent primary amine functionality comprising the reaction product of:
(i) a cyclic anhydride and
(ii) a amine compound comprising two primary amine groups; and (b) a polyepoxide resin comprising a plurality of cyclic carbonate groups and which is based on a novolac epoxy.

24. The coating composition of claim 23 wherein the amine compound (ii) further comprises a secondary amine group.

25. The coating composition of claim 23 wherein the amine compound (II) comprising two primary amine groups further comprises a secondary amine group.

26. The coating composition of claim 23 wherein the compound (a) has a polydispersity of about 3 or less.

27. The coating composition of claim 23 wherein the compound (a) has a polydispersity of about 1.1 or less.

28. The coating composition of claim 23 wherein the compound (a) has a polydispersity of about 1.05 or less.

29. The coating composition of claim 23 wherein compound (a) is formed by reacting a molar excess of the amine compound (ii) with the cyclic anhydride.

30. The coating composition of claim 29 wherein there is a ration of at least about four moles of amine compound (ii) for each mole of cyclic anhydride.

31. The coating composition of claim 23, wherein the cyclic anhydride is selected from the group consisting of phthalic anhydride compounds, hydrogenated phthalic anhydride compounds, succinic anhydride compounds, and maleic anhydride compounds.

32. The coating composition of claim 23, wherein the amine compound (ii) is a polyalkylene polyamine.

33. The coating composition of claim 23 wherein the amine compound (ii) is an α,ω-alkylenediamine.

34. The coating composition of claim 23 wherein the compound (a) is the reaction product of a ratio of at least about four moles of diethylenetriamine for one mole of phthalic anhydride.

35. The coating composition of claim 23, wherein the compound (b) has at least about three cyclic carbonate groups per molecule, on average.

36. A coating composition comprising:
(a) a compound with latent primary amine functionality comprising the reaction product of:
(i) a cyclic anhydride and
(ii) an amine compound comprising two primary amine groups and at least one secondary amine group; and (b) a compound comprising a plurality of cyclic carbonate groups, wherein the coating composition is a one-component liquid composition.

* * * * *